United States Patent [19]

Furuuchi et al.

[11] Patent Number: 4,833,015
[45] Date of Patent: May 23, 1989

[54] MULTILAYER FOAM GLASS WITH DENSE GLASS SURFACE LAYER AND METHOD OF PRODUCING SAME

[75] Inventors: Toshiharu Furuuchi; Makoto Nagano, both of Takaishi; Yoshiaki Tsuji, Osaka, all of Japan

[73] Assignee: Central Glass Company Limited, Ube, Japan

[21] Appl. No.: 170,347

[22] Filed: Mar. 18, 1988

[30] Foreign Application Priority Data

Mar. 20, 1987 [JP] Japan .................. 62-65950
Mar. 20, 1987 [JP] Japan .................. 62-65951
Mar. 20, 1987 [JP] Japan .................. 62-65952

[51] Int. Cl.$^4$ .................. B32B 3/26; B32B 17/00; B32B 5/20
[52] U.S. Cl. .................. 428/309.9; 428/312.2; 428/312.6; 428/318.6
[58] Field of Search .............. 428/309.9, 312.2, 312.6, 428/312.8, 318.6, 319.1

[56] References Cited

U.S. PATENT DOCUMENTS 3,709,772  1/1973  Rice .................. 428/312.6
4,552,800 11/1985  Blasch et al. .......... 428/312.6

FOREIGN PATENT DOCUMENTS 3006393  8/1981  Fed. Rep. of Germany ... 428/312.6
2552076  3/1985  France ................ 428/318.6
49-28251  7/1974  Japan .
50-123108 9/1975  Japan .
59-111948 6/1984  Japan .
60-12937  4/1985  Japan .
2188926 10/1987  United Kingdom .

Primary Examiner—William J. Van Balen
Attorney, Agent, or Firm—Fleit, Jacobson, Cohn & Price

[57] ABSTRACT

The invention relates to a foam glass block provided with a dense glass surface layer. To solve a problem that adhesion of the dense glass layer to the foam glass layer is insufficient, a relatively thin intermediate layer of porous glass is interposed between the basic foam glass layer and the dense glass layer. The intermediate layer has apparent specific gravity of 0.8-1.8, whereas the basic foam glass layer is lower than 0.8 in apparent specific gravity. The multilayer foam glass block is produced by simultaneously firing a granulated material of the basic foam glass, a granulated material of the intermediate porous glass and a particulate material of the dense glass in layers, or by firing a granulated material of foam glass and a particulate material of dense glass in layers and pressing the upper surface of the dense glass during or soon after firing. The outer surface of the dense glass layer may be formed with a number of fine cracks or a number of small semispherical protuberances to produce an ornamental effect.

11 Claims, 2 Drawing Sheets

MULTILAYER FOAM GLASS WITH DENSE GLASS SURFACE LAYER AND METHOD OF PRODUCING SAME

BACKGROUND OF THE INVENTION

This invention relates to a multilayer foam glass block having a dense glass surface layer and method of producing the same. The multilayer foam glass block is suitable for use as an interior or exterior decorative material in buildings or as an exterior wall material.

Foam glass, i.e. foamed glass, is low in specific gravity and high in heating-insulating ability but is relatively low in mechanical strength and also in resistance to flawing of surfaces. It is known, as shown in JP-A 50-123108 and JP 60-12937 for instance, to fusingly integrate a foam ceramic or glass layer and a dense and foamless glass layer into a block of shielded foam glass. As the foam glass layer is covered with the dense glass layer the obtained block is fairly high in rigidity and mechanical strength and has an outer surface high in hardness and resistant to flawing. Besides, the dense glass surface layer affords the foam glass block with glossiness and graveness characteristic of glass and produces a valuable ornamental effect.

However, problems are involved in tightly covering a low-density foam glass layer with a dense glass layer. Usually foam glass has an apparent specific gravity (hereinafter the term "bulk density" will be used in this sense) below 0.8 whereas the bulk density of the dense glass layer practically agrees with the true specific density of the employed glass, which is about 2.5. Becuase of such a great difference in density there arise significant differences in thermal characteristics between the foam glass layer and the dense glass layer. Particularly the dense glass layer is far higher in heat conductivity than the foam glass layer. Therefore, at the stage of annealing a foam glass block which is produced by a usual firing process and includes a unitarily formed dense glass layer it is inevitable that the dense glass layer solidifies, with some shrinkage, considerably faster than the under-lying foam glass layer no matter how precisely the cooling condition may be controlled. As a natural consequence, strains are induced between the two glass layers so that adhesion at the interface becomes insuf-ficient or defective. Accordingly the obtained foam glass block is liable to undergo cracking from the interfacial region by external and even relatively light shocks or by fatigue attributed to repeated weathering.

JP-A 59-111948 shows providing a glazed surface to a foam glass block by applying a cementing material containing a large amount of a hydraulic material to a simple foam glass block to fill a portion of open-pores in the foam glass block with the applied material and also to form an intermediate layer on the surface of the foam glass black, then applying a glaze onto the intermediate layer and firing the whole block to thereby finish a hard and dense surface layer of glaze. However, even in this case a considerable difference in heat conductivity between the foam glass layer and the foamless intermediate layer raises problems. Straining between these two layers is further promoted by significant thermal expansion of the hydraulic material such as cement or gypsum used in the intermediate layer. Although an anchoring effect of the hydraulic filling is expected, adhesion between the foam glass layer and the overlaid dense layer is not fundamentally improved and there is no merit in respect of productivity and production cost.

According to JP 49-28251, impact resistance of a foam glass block having a dense surface layer formed of vitreous enamel becomes high when the foam glass overlaid with the enamel layer has a bulk density higher than 0.4. However, the problem of insufficient adhesion between the two layers still remains unsolved, and it is not rarely that foam glass is desired to have a bulk density below 0.4.

SUMMARY OF THE INVENTION

It is an object of the present invention to provide a foam glass plate or block having a dense glass surface layer, which is improved in interfacial adhesion and can be produced relatively easily and inexpensively.

It is another object of the invention to provide a method of producing a foam glass block according to the invention.

According to the invention there is provided a multilayer foam glass plate or block, comprising a basic foam glass layer lower than 0.8 in bulk density, a dense glass surface layer on one side of the basic foam glass layer and an intermediate porous glass layer which intervenes between and tightly bonds to the basic foam glass layer and the dense glass surface layer and has a bulk density in the range of from 0.8 to 1.8.

In this multilayer foam glass block it is suitable that the bulk density of the basic foam glass layer is not lower than 0.2, and preferably is in the range of from 0.3 to 0.6. As to the intermediate porous glass layer, a preferred range of its bulk density is from 1.0 to 1.7. The intermediate layer may be a foamed glass layer. It will be understood that the dense glass surface layer is a substantially foamless layer of which bulk density is very close to the true specific gravity of the employed glass.

The intermediate porous glass layer is a relatively thin layer. Usually it suffices that the intermediate layer has a thickness of 0.5 to 10 mm.

According to the invention, the difficulty of tightly and stably bonding a dense glass surface layer to the basic foam glass layer is ovbiated by including the intermediate porous glass layer, and the provision of this intermediate layer has the effect of cushioning significant differences in thermal characteristics between the basic foam glass layer and the dense glass surface layer. Therefore, a multilayer foam glass block according to the invention has improved mechanical strength and very good resistance to weathering. Of course the present invention fully retains the merits of the dense glass surface layer such as flaw resistance and ornamental effects gained from glossiness, smoothness and grave appearance of the glass surface as well as the merits of foam glass such as low density and heat and sound insulating ability. Accordingly this multilayer foam glass block is very suitable for use as an interior or exterior decorative material for buildings and also as an exterior wall material.

A foam glass block according to the invention may be a five-layer block comprising, in addition to the above stated three layers, another intermediate porous glass layer and another dense glass surface layer on the opposite side of the basic foam glass layer.

A method of producing a multilayer foam glass block according to the invention comprises the steps of layering a granulated first material comprising a glass powder and a foaming agent, layering a granulated second material comprising a glass powder on the layer of the first material, layering a particulate glass on the layer of the second material, and firing the materials in layers to cause fusion of the glasses in the respective layers.

Another method of producing a multilayer foam glass block according to the invention comprises the steps of layering a granulated material comprising a glass powder and a foaming agent, layering a particulate glass on the layer of the granulated material, firing the materials in layers to cause fusion of the glasses in the respective layers, and pressing the upper surface of the fired layers at a pressure of 0.1 to 4 kg/cm$^2$ during or soon after the firing step.

Any desired layer of this multilayer foam glass block may utilize a colored glass. In the outer surface of the dense glass surface layer, fine cracks may be formed in a pattern having an ornamental effect. To produce a differently ornamental effect, the outer surface may be formed with a large number of small and closely distributed semispherical protuberances.

DETAILED DESCRIPTION OF THE INVENTION

Figure 1:
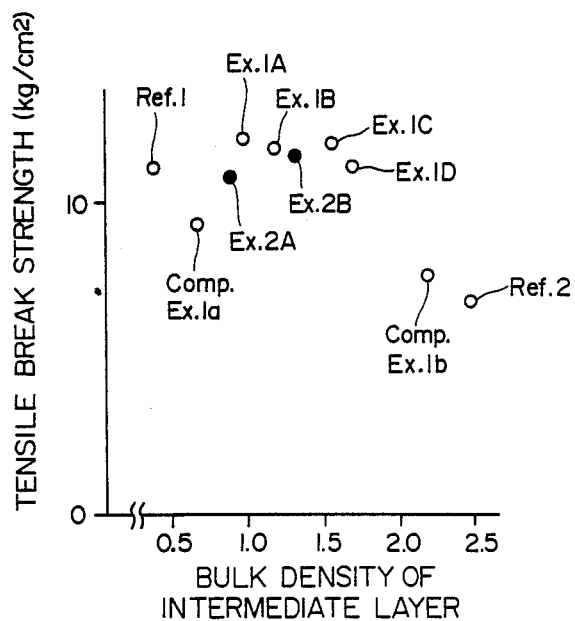
FIG. 1 is a graph showing the relationship between the bulk density of the intermediate porous glass layer in a multilayer foam glass block according to the invention and tensile strength of the block.

The total thickness of a multilayer foam glass plate or block according to the invention is not strictly limited, but for most uses a suitable thickness is in the range from about 30 mm to about 125 mm. When the total thickness is less than 30 mm the foam glass block may be insufficient in heat insulating capability, but it is not necessary to increase the thickness beyond about 125 mm insofar as heat insulation in ordinary buildings is concerned. When the thickness is further increased the foam glass block becomes considerably heavy against the current trend toward lightweight and high-rise buildings, and heaviness offers inconvenience to handling and constructing working.

The intermediate porous glass layer according to the invention intervenes between the basic foam glass layer and the dense glass surface layer to establish a good physical bond between the underlying and overlying layers. To serve this purpose it suffices that the intermediate porous glass layer has a thickness of 0.5 mm, but the thickness can be increased up to about 10 mm without any problem. For example, the intermediate porous glass layer can be formed of a colored glass so that the color can be seen through the overlying dense glass layer, and in such case the intermediate layer needs to have a thickness of several millimeters.

The dense glass surface layer provides surface hardness and flaw resistance to the foam glass block. In this regard it suffices that the dense glass layer has a thickness of 1 mm, but the thickness may be increased up to about 10 mm to augment a grave impression of glass. A colored glass may be used as the material of the dense glass layer, or colored glass grains may be incorporated in the material.

It is preferred that the summed thickness of the dense glass surface layer and the intermediate porous glass layer is not more than 20 mm. When the summed thickness of these two layers is more than 20 mm the multilayer foam glass block becomes too brittle and weak to external shocks. Also it is preferred that the summed thickness of the dense glass layer and the intermediate layer is not more than ¼ of the whole thickness of the multilayer foam glass block so that heat insulating capability, lightweightness and hadlability of the foam glass block may not be marred.

The basic foam glass layer is required to be lower than 0.8 in bulk density because when the bulk density is above 0.8 the foam glass will be degraded in heat insulating ability, lightweightness and workability. It is desirable that the bulk density of the basic foam glass layer is not lower than 0.2 because foam glass of a lower bulk density is insufficient in strength for use as a building material. Preferably the basic foam glass layer is formed so as to have a bulk density in the range from 0.3 to 0.6.

The bulk density of the intermediate porous glass layer must be not lower than 0.8 for ensuring good adhesion to the dense glass surface layer and not higher than 1.8 for ensuring good adhesion to the basis foam glass layer. Preferably the intermeidate layer is formed as a foam glass layer having a bulk density in the range from 1.0 to 1.7. In structure, this intermediate porous glass layer is analogous to the crust layer (outermost layer) of a foam glass block disclosed in GB-A 2,188,926 (published Oct. 14, 1987).

The dense glass surface layer is an unfoamed glass layer. Therefore, specific gravity of this layer is around 2.5, i.e. close to the true specific gravity of the employed glass. To gain full merits of this glass surface layer care should be taken in forming this layer not to leave bubbles or pores in the solidified glass layer.

In producing a multilayer foam glass block according to the invention the material of the basic foam glass layer is essentially a mixture of a fine powder of an ordinary glass such as, for example, soda lime glass, borosilicate glass or aluminosilicate glass, and a conventional foaming agent in fine powder form, such as lime stone or calcium carbonate, dolomite or carbon. The glass may be either colored or colorless. The true specific gravity of the glass powder is about 2.5, and usually the particle size of the glass powder is not larger than 100 μm. Optioanally inorganic pigment may be added to the glass powder. The powder mixture is wetted with a suitable binder such as water glass and granulated by a suitable method into granules which are from about 0.1 mm to several millimeters in diameter.

The powder mixture of glass and foaming agent is very bulky and contains a large amount of air. If this powder mixture is fired, without being granulated, in the glass melting and foaming operation a portion of the occluded air remains in the melted glass and expands. This becomes a cause of undesirable phenomena such as development of coarse bubbles and voids, undulating of the interface between the foam glass layer and the overlaying intermediate layer and even local penetration of the foam glass into and through the intermediate layer to result in direct contact of the basic foam glass layer with the dense glass layer. Besides, the use of the ungranulated powder mixture tends to give a foam glass layer having a large number of open or interconnecting pores. Such disadvantages are obviated by granulating the powder mixture since occlusion of air is greatly reduced. The foam glass layer formed by using the granulated material is remarkably low in water absorption and water permeation because in this case most of the pores are closed cells. Besides, the granulated material exhibits good fluidity and accordingly is convenient for pouring into a molding box or the like and can easily be stratified to provide a flat layer.

The material of the intermediate porous glass layer is, in essence, a fine powder of an ordinary glass similar to the glass powder used as the principal material of the basic foam glass layer. Optionally, a conventional foaming agent in fine powder form and/or inorganic pigment may be added to the glass powder. In every case the powder material is granulated by using a suitable binder such as water glass to obtain granules about 0.1 mm to several millimeters in diameter. The merits of using such a granulated material are as described above with respect to the basic foam glass layer, so that an intermediate glass layer of a uniformly porous structure can be obtained.

If desired, the granulated material of the intermediate layer is mixed with glass grains which will afford an elegant appearance to the multilayer foam glass block including the intermediate porous glass layer. The glass grains are relatively coarse grains, e.g. 0.5-5 mm grains, and may not be uniform in size, and may be colored uniformly or irregularly.

The bulk density of the basic foam glass layer and the bulk density of the intermediate porous glass layer can respectively be controlled by selection of the softening temperature of the glass as the principal material, the kind and amount of foaming agent, the kind and amount of optional additive and/or conditions of firing the granulated materials.

The material of the dense glass surface layer is a particulate glass. It is suitable to employ the same glass and the principal material of the basic foam glass layer and/or the intermediate porous glass layer or a frit lower in softening point than said glass. It is important that the thermal expansion coefficient of the employed glass is close to the thermal expansion coefficients of the basic foam glass layer and the intermediate layer. By using a particulate glass larger than 0.3 mm in particle size, it is easy to soften and melt the glass to consequentially obtain a dense glass layer which is poreless and has a specific gravity close to 2.5.

In producing a multilayer foam glass block according to the invention, the above described three kinds of materials are layered one upon another and fired simultaneously. The means to accomplish such operations is not limited. For example, first the granulated material of the basic foam glass layer is put into a molding box of steel so as to provide a bed having a predetermined thickness, and then the granulated material of the intermediate glass layer is layered on the aforementioned bed and is overlaid with the particulate material of the dense glass surface layer. Then the layered materials in the molding box are fired in a furnace at a suitable temperature, which is usually from 700° to 1000° C., to cause fusion of the glass in every layer and foaming of the glass in the bottom layer and, in some cases, the glass of the intermediate layer. To ensure tight adhesion of each glass layer to the adjacent glass layer(s), a pressure of suitable magnitude may be applied to the layered materials either during the firing operation or immediately after completion of firing. The firing operation is followed by a usual coolind or annealing treatment.

The same multilayer foam glass block can be produced continuously and probably more economically by using a belt conveyor system having a pair of vertically spaced and horizontally running belts made of a heat resistant material to simultaneously and continuously introduce the three kinds of materials into a furnace in which fusing and foaming are accomplished. On the lower belt the three kinds of materials are layered one upon another in due order, and the uppermost layer of the material of the dense glass is covered with the upper belt. The heat-resistant belts passes through the furnace so that the layered materials are fired in the state sandwiched between the upper and lower belts.

In the present invention it is possible to use the material of the basic foam glass layer also as the material of the intermediate porous glass layer. In such a case, the granulated material of the foam glass layer is layered in a molding box to a thickness determined with consideration of the intended thickness of the intermediate layer, and the particulate material of the dense glass surface layer is layed on the layer of the granulated material. The layering may be accomplished by using a pair of vertically spaced conveyor belts. The layered materials are fired usually at 700°-1000°. Naturally, foaming of the glass in the lower layer takes place. To form an intermediate foam glass layer of a desired bulk density by utilizing an upper part of the layer of the foam glass material, a pressure of 0.1 to 4 kg/cm$^2$ is applied to the surface of the layer of the dense glass material either during the firing operation or immediately after completion of firing. A suitable magnitude of the pressure depends on the desired bulk density of the intermediate foam glass layer. If an excessively high pressure is applied the basic foam glass layer will become too high in bulk density. It is preferred to apply a pressure in the range from 1 to 3 kg/cm$^2$. For example, the pressure is applied by means of a plurality of pressing rolls optionally with interposition of a heat resistant belt between the rolls and the surface of the dense glass layer or its material.

A multilayer foam glass block according to the invention may be a reinforced foam glass block in which the basic foam glass layer is reinforced with a metal material such as wires, wire netting or panting metal. The reinforcing metal material is preferably coated with an adhesive binder and can be embedded in the basis foam glass layer by a known technique. For example, the metal material is disposed in a molding box in advance of pouring the granulated material of the foam glass. In the case of a continuous process using conveyor belts for introducing the materials into a furnace, the metal material too is continuously fed into the furnace by inserting it in the layer of the material of the basic foam glass on the lower belt.

In the present invention it is optional to provide the dense glass surface layer and the intermediate porous glass layer on each side of the basic foam glass layer to thereby form a five-layer foam glass block which is very strong and can be used as an exterior wall material. Such a five-layer glass block can be produced by modifying the above described batchwise or continuous manufacturing method so as to layer first the material of the dense glass surface layer and then the granulated material of the intermediate porous glass layer precedent to layering of the material of the basic foam glass layer in the above described process.

In a multilayer foam glass block according to the invention, the outer surface of the dense glass layer may be undulated or engraved so as to provide a number of somewhat recessed areas and somewhat projecting areas. In the case of a three-layer block the exposed back surface of the basic foam glass layer may similarly be processed instead of or in addition to the processing of the dense glass layer surface. In cementing the foam glass block to a wall surface, the undulation or engraving serves the purpose of enlarging the bonding area. From a different point of view, the engraving produces an aesthetically favorable effect when the recessed and projecting areas are arranged in a suitable pattern and the engraved surface is used as the esternal surface. Such undulating and patterned engraving can easily be accomplished by using a molding box in which the inner surface of the bottom is formed with undulations or a number of suitably shaped projections, by using a press platen formed with undulations or a number of projections, or by using a meshed conveyor belt in the above described continuous process.

EXAMPLE 1

As the principal material of a basic foam glass layer of multilayer foam glass block, cullet of ordinary soda lime glass was pulverized to a fine powder not larger than 100 μm in particle size, and the glass powder was mixed with 0.7 wt % of calcium carbonate powder used as a foaming agent. A small amount of water glass was added to the powder mixture, and the resultant mixture was kneaded and granulated by a tumbling granulation method into grains 0.5-2 mm in diameter.

The aforementioned soda lime glass powder was used also as the principal material of an intermediate porous glass layer. The glass powder was mixed with and a small and variable amount of calcium carbonate powder which was used to control the porosity and bulk density of the intermediate glass layer. A small amount of water glass was added to the powder mixture, and the resultant mixture was kneaded and granulated into grains 0.5-2 mm in diameter.

As the material of a dense glass surface layer, cullet of soda lime glass was pulverized into 0.5-2 mm particles.

The granulated material of the basic foam glass layer was poured into a molding box so as to accumulate to a predetermined thickness, and then the granulated material of the intermediate layer was stratified on the firstly stratified granular material, and then the material of the dense glass layer was stratified on the precedingly stratified granular material. In that state the materials in the molding box was fired in a furnace at 750°–900° C. for 20-60 min, followed by annealing.

The product of the above process was a three-layer foam glass block consisting of a basic foam glass layer having a thickness of 42, an intermediate foam glass layer having a thickness of 5 mm and a dense glass surface layer having a thickness of 3 mm. The basic foam glass layer had a bulk density of 0.4, and the specific gravity of the dense glass layer was 2.5. The bulk density of the intermediate layer was varied over the range from 1.0 to 1.7 by controlling the amount of the calcium carbonate powder in the material and the firing conditions to obtain four different samples, as Examples 1A (the bulk density was 1.0), 1B (the bulk density was 1.3), 1C (the bulk density was 1.5) and 1D (the bulk density was 1.7).

COMPARATIVE EXAMPLE

Using the same materials and the same process as in Example 1, two different samples of the three-layer foam glass block were produced. In one sample, Comparative Example 1a, the bulk density of the intermediate foam glass layer was 0.7. In the other sample, Comparative Example 1b, the bulk density of the intermediate layer was 2.2. In other points there was no change from Example 1.

EXAMPLE 2

The granulated material of the basic foam glass layer prepared in Example 1 was stratified in a molding box, and the glass particles prepared in Example 1 as the material of the dense glass layer was stratified directly on the layer of the foam glass material. In that state the two kinds of materials in the molding box were fired in a furnace at 750°–900° C. for 20-60 min. At the last stage of the firing process a pressure of 1.5 kg/cm$^2$ was applied to the surface of the dense glass layer for 10 min. After that annealing was made.

The product of this process was a three-layer foam glass block consisting of a basic foam glass layer having a thickness of 46 mm, an intermediate foam glass layer having a thickness of 1 mm and a dense glass surface layer having a thickness of 3 mm. The basic foam glass layer had a bulk density of 0.4, and the dense glass layer had a bulk density of 2.5. The bulk density of the intermediate layer was 0.9 in one sample, Example 2A, and 1.3 in another sample, Example 2B.

REFERENCE 1

Using the material of the basic foam glass layer prepared in Example 1, a single-layer foam glass block having a thickness of 50 mm was produced. The bulk density of the foam glass was 0.4.

REFERENCE 2

Using the same materials as in Example 2, a two-layer foam glass block consisting of a foam glass layer having a thickness of 47 mm and a dense glass layer having a thickness of 3 mm was produced. The foam glass had a bulk density of 0.4, and the dense glass layer had a bulk density of 2.5.

From each of the foam glass block samples of Examples 1 and 2, Comparative Example and References 1 and 2, test pieces 20 mm × 20 mm in widths and 50 mm in length (in the thickness direction of the foam glass block) were cut out and subjected to testing with a tensile tester by applying tension in the lengthwise direction. The results are shown in FIG. 1.

As can be seen in FIG. 1, the three-layer foam glass blocks of Examples 1A to 1D and Examples 2A and 2B were pretty high in tensile break strength. In these foam glass blocks the bulk density of the intermediate foam glass layer ranged from 0.9 to 1.7 as noted hereinbefore. In every test piece of these foam glass blocks, break by the tensile test occurred within the basic foam glass layer. In the test pieces of the three-layer foam glass block of Comparative Example 1a low in bulk density of the intermediate foam glass layer, break occurred at the interface between the intermediate layer and the dense glass layer, and the tensile break strength was relatively low. In the test pieces of the foam glass block of Comparative Example 1b very high in bulk density of the intermediate layer, break occurred at the interface between the intermediate layer and the basic foam glass layer, and the tensile break strength was very low. In the test pieces of the two-layer foam glass block of Reference 2 not including the intermediate layer, break occurred at the interface between the foam glass layer and the dense glass layer, and the tensile break strength was still lower. Thus, the test evidenced a remarkably favorable effect of the intermediate porous glass layer according to the invention on the interfacial bonding in the multilayer foam glass block.

As an option of the present invention, the outer surface of the dense glass surface layer of the multilayer foam glass body may be formed with a number of fine cracks which are distributed over substantially the entire area of said outer surface in a pattern which gives an ornamental effect. Such cracks can be produced by controlling the particle size of the glass material and the firing conditions, or by adding a sinterable additive to the particulate glass as the principal material. In either case it is effective to apply an adequate pressure to the surface of the dense glass layer under firing or immediately after firing.

Figure 2:
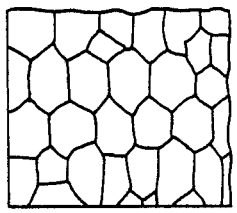
FIGS. 2 and 3 are fragmentary plan views of multilayer foam glass blocks according to the invention, respectively, and show two examples of patterns of fine cracks intentionally formed in the glass surface.
Figure 3:
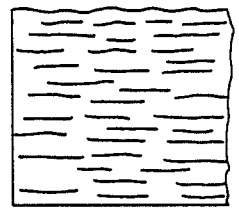

As to the particle size of the glass material, it is favorable for producing desired cracks to use glass particles not larger than about 0.3 mm to thereby decrease bulk density of the layered glass material and increased air existing in the glass material under firing. For example, by using glass particles smaller than 0.1 mm it is relatively easy to produce fine cracks in a pattern of continuous and irregular hexagons or different polygons, as shown in FIG. 2. By using glass particles of 0.1–0.3 mm it is relatively easy to produce fine cracks in a pattern of approximately parallel and irregularly interrupting stripes, as shown in FIG. 3. The cracks in either of such patterns seem to be natural cracks and will be more highly valued than regular geometric patterns.

The aforementioned sinterable additive should have a melting point higher than the softening point of the particulate glass as the principal material. Preferred examples are wallastonite, silica sand, feldspar, zircon sand, sillimanite and mullite. The additive should be a powder not larger than 150 $\mu$m, and preferably not larger than 50 $\mu$m, in particle size. When such additive is used the glass particles do not need to be smaller than 0.3 mm. The amount of the sinterable additive is 3 to 24 wt % of the particulate glass. When the additive amounts to more than 24 wt %, the cracks produced in the dense glass surface become individually so wide that the ornamental effect is spoiled and that the glass surface layer becomes fragile. It is suitable to limit the amount of the sinterable additive within the range of 3–15 wt % for producing fine cracks in the pattern of parallel and interrupting stripes as shown in FIG. 3. When the same additive amounts to more than 15 wt % but not more than 24 wt % it is likely that cracks are produced in a polygonal pattern as shown in FIG. 2.

When the multilayer foam glass block is produced by the continuous process using heat-resistant belts, the pressing action of the rolls beneath the lower belt and the rolls over the upper belt has some effects on cracking of the dense glass surface layer. In the case of using 0.1–0.3 mm particles of the dense glass material it is likely that linear cracks as shown in FIG. 3 are produced to extend parallel to the longitudinal axes of the respective rolls, whereas use of still smaller particles in the same manufacturing method usually provides cracks in a polygonal pattern as shown in FIG. 2. When 3–15 wt % of a sinterable additive is mixed with relatively large particles of the dense glass material it is likely that linear cracks are produced to extend parallel to the axes of the respective rolls, and when the same additive is increased to more than 15 wt % cracks are produced in different directions so that a pattern of the type shown in FIG. 2 is obtained.

Figure 4:
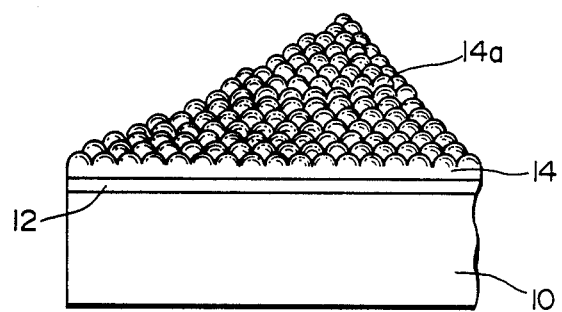
FIG. 4 is a fragmentary perspective view of another multilayer foam glass block according to the invention, which has a large number of small semispherical protuberances on the glass surface.

FIG. 4 shows a multilayer foam glass block in which another option of the present invention is employed. The foam glass block consists of a basic foam glass layer 10, an intermediate porous glass layer 12 and a dense glass surface layer 14. The outer surface of the dense glass layer 14 is formed with a great number of small and nearly semispherical protuberances 14a, which are closely distributed over substantially the entire area of said outer surface. Usually these semispherical protuberances 14a are from about 0.2 mm to about 3 mm in diameter. An ornamental effect is produced by forming such protuberances 14a. Besides, the foam glass block becomes better in sound insulating capability.

To form the semispherical protuberances 14a, it is suitable that the material of the dense glass layer 14 is in the form of granules larger than about 0.3 mm. Alternatively, the glass material may be a mixture of relatively small particles and glass spheres larger than about 0.3 mm. The materials of the three layers 10, 12, 14 are layered one upon another and fired all together for fusion of the respective layers and foaming of the lowermost layer 10 and, in many cases, also the intermediate layer 12. In the firing operation the upper surface of the dense glass material layer is left free, and pressure is not applied to the outer surface. Although fusion of the upper layer 14 provides a generally flat upper surface, largeness of the granules of the dense glass material and foaming of the underlying layers cause the upper surface to have numerous undulations. At the cooling step following the firing operation, a suitable board or the like is pressed against the upper surface of the dense glass layer 14 when this layer is cooled to a temperature below the softening point of the dense glass while the underlying layers 10 and 12 have not solidified yet. Formation of the desired protuberances 14a is completed by this pressing work. In the case of producing the multilayer foam glass block by the continuous process using a pair of heat-resistant belts in the manner described hereinbefore, the upper belt is kept spaced from the upper surface of the layered glass materials during the firing operation. The upper belt is pressed against the glass surface by the upper rolls when the dense glass layer 14 is cooled to the aforementioned degree before solidification of the underlying layers.

What is claimed is:
1. A multilayer foam glass block, comprising:
a basic foam glass layer lower than 0.8 in apparent specific gravity;
a dense glass surface layer provided on one side of said foam glass layer; and
an intermediate porous glass layer which intervenes between the tightly bonds to said foam glass layer and said dense glass surface layer and has an apparent specific gravity in the range of from 0.8 to 1.8.
2. A foam glass block according to claim 1, wherein the apparent specific gravity of said foam glass layer is in the range of from 0.3 to 0.6.
3. A foam glass block according to claim 2, wherein the apparent specific gravity of said intermediate porous glass layer is in the range of from 1.0 to 1.7.
4. A foam glass block according to claim 1, wherein the thickness of said intermediate porous glass layer is not less than 0.5 mm and the thickness of said dense glass surface layer is not less than 1 mm on the proviso that the summed thickness of said surface layer is not more than 20 mm.

5. A foam glass block according to claim 4, wherein said summed thickness is not more than ¼ of the whole thickness of the multilayer foam glass block.

6. A foam glass block according to claim 1, further comprising a reinforcing metal material which is embedded in said basic foam glass layer.

7. A foam glass block according to claim 1, wherein a number of fine cracks are formed in the outer surface of said dense glass surface layer over substantially the entire area of said outer surface, said cracks being in a pattern which gives an ornamental effect.

8. A foam glass block according to claim 7, wherein said cracks are formed in a pattern of continuous and irregular polygons.

9. A foam glass block according to claim 7, wherein said cracks are formed in a pattern of approximately parallel and irregularly interrupting stripes.

10. A foam glass block according to claim 1, wherein the outer surface of said dense glass surface layer is formed with a number of small generally semispherical protuberances which are closely distributed over substantially the entire area of said outer surface.

11. A foam glass according to claim 10, wherein said generally semispherical protuberances are from about 0.2 mm to about 3 mm in diameter.

* * * * *